United States Patent

[11] 3,586,448

| [72] | Inventor | Jacques Beasse<br>Paris, France |
|---|---|---|
| [21] | Appl. No. | 33,171 |
| [22] | Filed | May 8, 1970 |
| [45] | Patented | June 22, 1971 |
| [73] | Assignee | Societe Des Lunetiers, Temkine & Cie<br>Paris, France |
| [32] | Priority | May 14, 1966 |
| [33] | | France |
| [31] | | 61,658 |
| | | Continuation of application Ser. No.<br>619,261, Feb. 28, 1967, now abandoned. |

[54] METHOD AND APPARATUS FOR POSITIONING A LENS BLANK RELATIVE TO A PHOTOGRAPH OF A WEARER
14 Claims, 9 Drawing Figs.

[52] U.S. Cl. .................................................. 356/172,
33/174, 351/5
[51] Int. Cl. ....................................................... B23q 17/18,
G01b 11/27
[50] Field of Search........................................ 351/5, 7;
33/174; 51/277, 284; 356/124, 127, 172, 166, 165, 164, 167, 171

[56] References Cited
UNITED STATES PATENTS
3,015,196 1/1962 Campbell....................... 51/284

FOREIGN PATENTS
1,211,813 3/1966 Germany...................... 351/5
1,021,827 3/1966 Great Britain................ 351/178

Primary Examiner—Ronald L. Wibert
Assistant Examiner—Orville B. Chew, II
Attorneys—Robert E. Burns and Emmanuel J. Lobato ABSTRACT: Device for adjusting the position of an optical lens on a suction cup for the direct transfer thereof to a grinding machine, as a function of the pupillary distance of the wearer and of the centerlines of the spectacle frame, which comprises a suction-cup carrier, a transparent plate having engraved thereon the perpendicular centerlines AA and BB of the spectacle frame which are coincident with the centerlines of the lens template, a photograph of the spectacle frame, positioned on said carrier and having printed thereon the pupillary axes, the optical lens having the optical centerlines to be brought into registration with the aforesaid centerlines, characterized in that it comprises means for moving said suction-cup carrier to the position of coincidence of its center with the point of intersection of the axes of the spectacle frame or a homologous point, means for bringing the optical center of the lens to a position of coincidence with the pupillary axis of the photographed eye or homologous point, other means carrying fixed crosslines corresponding with the axis of the suction-cup carrier and movable crosslines adapted to locate, between said points, the center of the pupil and the optical center of the lens.

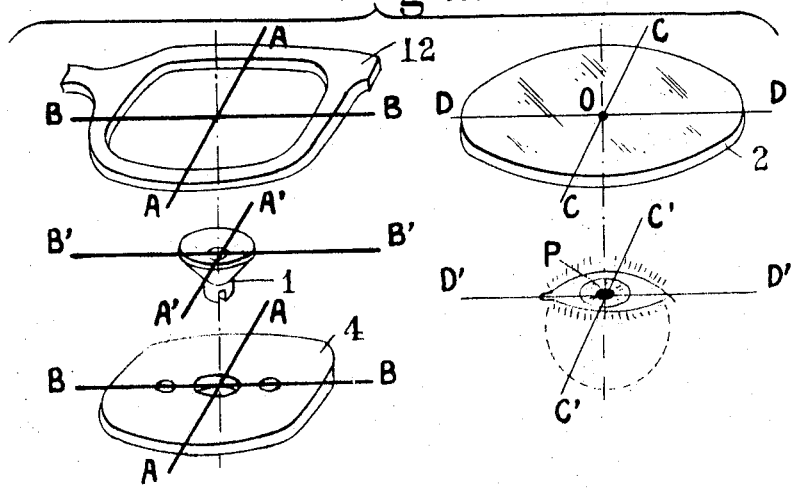
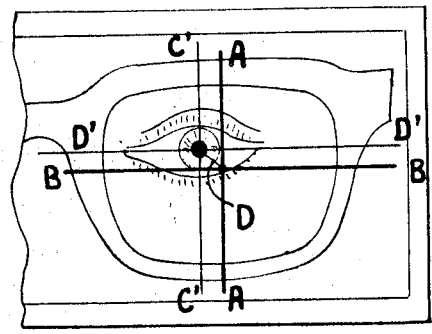
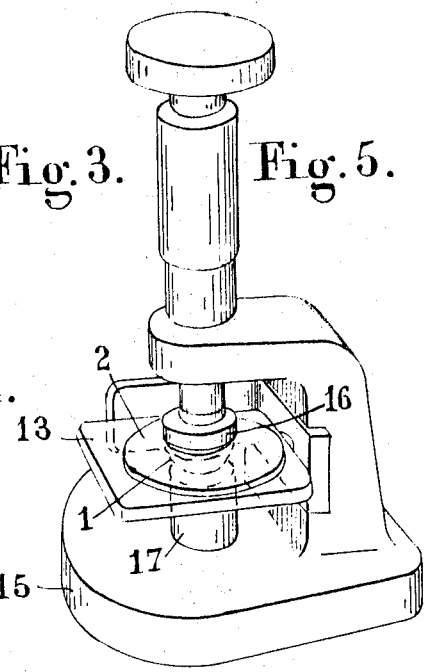
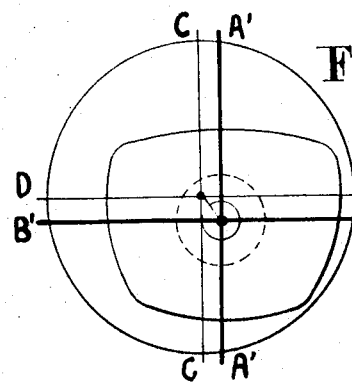
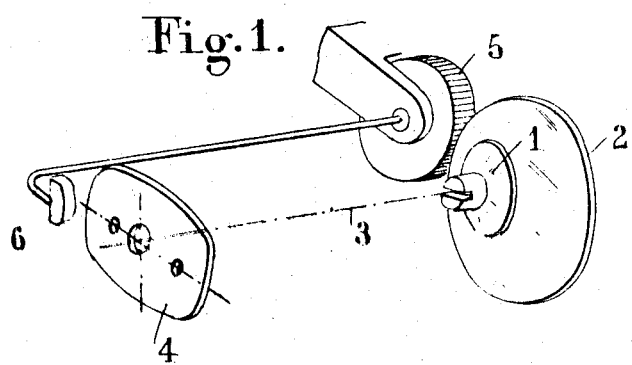

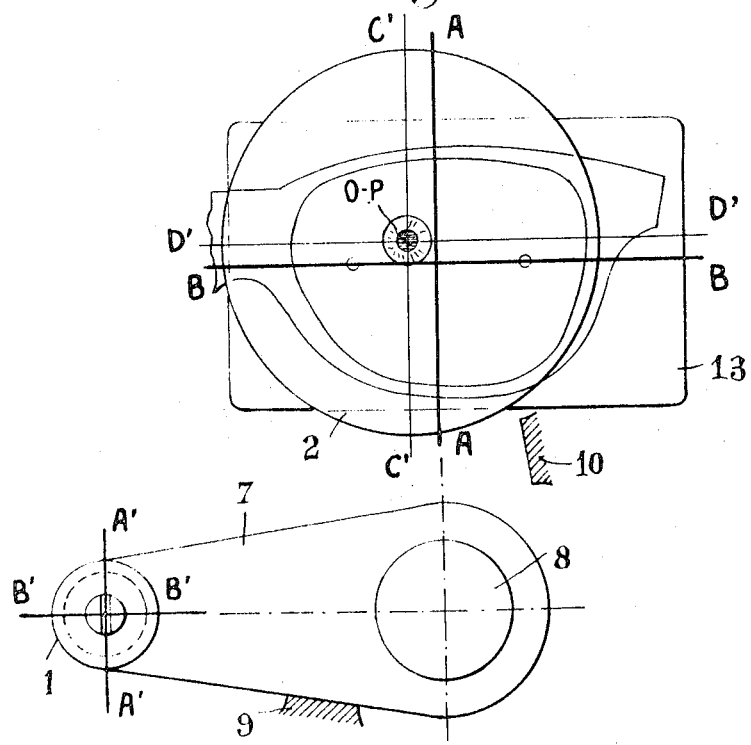
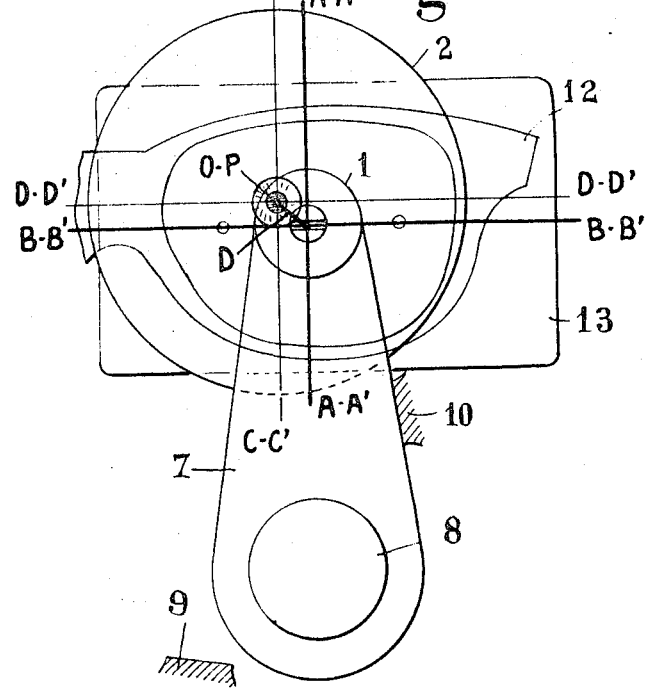

METHOD AND APPARATUS FOR POSITIONING A LENS BLANK RELATIVE TO A PHOTOGRAPH OF A WEARER

This application is a continuation of application Ser. No. 619,261 filed Feb. 28, 1970 and now abandoned.

Spectacle lenses must be so positioned in the spectacle frame that their optical centers correspond to the pupillary centers under remote-sight conditions. Now as a rule the center of pupils is not coincident with the distance between the perpendicular centerlines of the frame rims, so that it is necessary to position the lens on the axis of the template of the trimming machine with its optical axis out of center relative to the point of intersection of the centerlines of the spectacle frame.

This positioning operation must be attended by two measurements:

1. Measurement of the distance between the points of intersection of the centerlines of each frame rim;
2. Measurement of the pupillary distance.

Nowadays these measurements are made with a rule or a caliper divided into millimeters or fractions (64 ths) of an inch, in the case of the spectacle frame, and with a pupillometer for the interpupillary distance.

From these two measurements the vertical out of center and the horizontal out of center are calculated for the optical center of the lens with respect to the template provided with reference axes, this template reproducing the final contour of the lens. These differences in centers are then traced on the lens, whereby the latter can subsequently be properly positioned on the suction cup. This procedure obviously involves a considerable number of successive steps, the use of various measurement means, the transfer of dimensions and time-robbing and necessarily inaccurate handlings.

Now, in the U.S. Patent application Ser. No. 447,768, there is described a photographic method whereby a 1:1 scale image can be obtained directly to reproduce the spectacle mounting and the pupils of the eyes; the degree of out of center of the pupillary axis relative to the point of intersection of the centerlines of each frame rim can easily be read on this image; the present invention is concerned with a device whereby the lens can be positioned on the suction cup, before mounting and centering the latter on the axis of the template of the grinding machine, by taking due account of the vertical and horizontal differences between the position of the optical center of each lens and the centerlines of the spectacle frame.

This invention is also concerned with mechanical means for positioning the suction cup on the lens.

A transparent glass plate on which perpendicular lines are traced is laid upon the photograph of the spectacle frame so as to cause its centerlines to be coincident with those of the frame; thus, the degree of out-of-center of the point of intersection of these centerlines relative to the pupillary axis is readily determined.

The lens is subsequently laid upon the plate so as to cause its optical center to be coincident with the pupillary axis, to give the dimension of the out of center.

Then it is only necessary to press the suction cup on the thus positioned lens, and the glass is trimmed in the conventional manner, so that the coincidence of the optical axis of the lens with the pupillary center under remote-sight conditions is obtained without resorting to any measuring instruments whatsoever.

The device for pressing the suction cup against the lens may comprise a cup-carrier and a presser member. The glass plate is so centered on the cup-carrier that its center be coincident with the axis of the suction cup, the lens being positioned on this glass plate as already explained hereinabove. Then the suction cup is pressed against the lens.

Another form of embodiment of this device may comprise a rotary arm carrying on its outer end the suction cup which can thus be pressed against the lens positioned on the glass plate, adjustable abutment means being provided for limiting the permissible movement of this arm.

In the case of a machine requiring the use of a suction cup on the concave side of the lens, the rotary arm may be used for reversing the position and a glass plate formed with a central aperture permitting the passage of the suction cup may be used.

Another possible form of embodiment may comprise a fixed suction-cup carrier arm and a transparent rule having reference lines formed thereon which are caused to register by translation with the pupillary centers. Instead of laying the lens on the photography, a transfer externally of the photography is made under the arm.

Another modified embodiment of this invention may comprise a camera lucida including a sighting prism associated with two mirrors giving simultaneously in the prism the image of the frame picture and of the lens to be positioned on its suction cup.

A more detailed description of the device constituting the subject-matter of this invention and of various forms of embodiment thereof will now be described with reference to the attached drawings in which:

FIG. 1 is a diagrammatic view of the lens trimming machine;

FIG. 2 is an exploded diagrammatic view showing the spectacle frame, the template of the final lens, the lens to be centered and the wearer's eye;

FIG. 3 shows diagrammatically the photograph of the spectacle frame and of the wearer's eye;

FIG. 4 is a similar view showing the lens on its suction cup after the lens has been properly positioned relative to the template;

FIG. 5 is a perspective view showing a simple device for pressing the suction cup against the lens surface;

FIG. 6 is another diagrammatic view showing a device comprising a pivoted suction-cup carrier arm;

FIG. 7 shows the same device with the carrier arm in its operative position;

Figure 8:
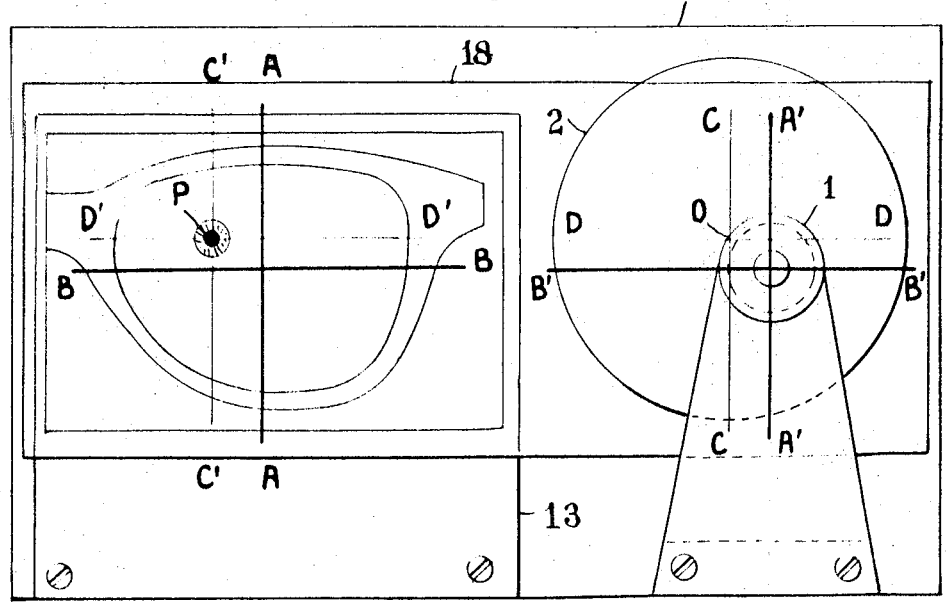
FIGS. 8 and 9 are diagrams showing modified forms of embodiment of the device.

As shown in diagrammatic form in FIGS. 1 and 2 of the drawings the problem to be solved consists in so mounting the suction cup 1 carrying the spectacle lens 2 on the axis 3 of the template 4, that the grinding wheel 5 operatively connected to the follower 6 will trim the lens in such a way that the optical center of the lens corresponds to the pupil center under remote-sight conditions.

Use is made of the following components: a spectacle mounting or frame 12 with rims or simply a front bar, having perpendicular centerlines AA and BB, a suction-cup 1 having perpendicular axes A'A' and B'B', a template 4 which is the homologue of the final lens contour, with perpendicular centerlines AA and BB, a lens 2 to be centered and having perpendicular centerlines CC and DD, of which the optical axis 0 must be coincident with the pupil P having imaginary centerlines designated by the letters C'C' and D'D'.

It will be seen that if a glass plate 13 (see FIG. 5) is placed upon the photographic picture of FIG. 3, this plate having traced thereon two perpendicular lines AA and BB corresponding to those of the template 4, there is a certain degree of out-of-center D between the crossing of these axes brought in coincidence wit the crossing of the axes CC and DD of the lens and of the pupillary center. Therefore, lens must be moved until its optical axis, at the intersection of axes CC and DD, is coincident with the pupillary axes C'C' and D'D'.

To this end, a mechanical device of the type illustrated diagrammatically in FIGS. 5 to 9 is used.

The simplest device is shown in FIG. 5, wherein a base plate 15 carries by means of a bracket a presser member 16 coaxial with the suction cup 1 supported by a socket 17. The engraved glass plate 13 having a central aperture and supporting the lens 2 is disposed between the suction cup 1 and its presser member 16; it is only necessary to actuate this presser member 16 downwardly for pressing the suction cup against the concave side of the lens through the aperture formed in the glass plate 13 and to subsequently release the lens and its suction cup for positioning this assembly on the trimming machine.

In the arrangement illustrated in FIGS. 6 and 7 of the drawings the suction cup 1 is detachably mounted on the end of an arm 7 adapted to pivot about a pin 8 within the limits permitted by the stop 9 in the inoperative position and another stop 10 in the operative position; in this last position the axes of the suction cup, designated by the letters A'A' and B'B' register with the point of intersection of the centerlines AA and BB of the spectacle frame 12.

The photograph shown in FIG. 3 is placed under a transparent plate 13 on which the perpendicular lines AA and BB are traced, these lines corresponding to the centerlines of the frame and template.

At this time it will be seen that, save in very unfrequent instances, the axes C'C' and D'D' passing through the center of the pupil are shifted both horizontally and vertically in relation to the lines AA and BB; therefore, to obtain the desired result the lens 2 must be more or less displaced to cause its optical center O to register with the pupil axis.

By rotating the arm 7 the suction cup 1 is pressed against the intersection of the axes AA and BB which is spaced by a distance D from the pupillary axis and from the optical center of the shifted lens.

The suction cup thus adhering to the lens may subsequently be used for positioning the latter on the lens grinding machine.

When it is desired to utilize the suction cup on the concave face instead of the convex face, the pivoting arm 7 may be used for reversing the position. In this case, the detachable suction cup 1 is disposed on the arm 7 as the latter engages the stop 9, a counter-cup being used if desired for acting as a presser member. It is then only necessary to remove the useless suction cup and to subsequently transfer the lens and suction-cup assembly to the trimming machine.

In the alternate form of embodiment illustrated in FIG. 8 the component elements are so disposed that the reference lines or axes can register with one another as in the preceding cases.

The base 15 receives the transparent or glass plate 13 on which the reference or crosslines AA and BB are traced or engraved as in the preceeding forms of embodiment, the photograph being inserted under this plate. Upon this plate 13 is superposed a somewhat longer transparent graduated rule 18 on which are engraved on the one hand the pupillary axes C'C' and D'D' overlying the plate 13, and on the other hand, on the adjacent portions externally of the photograph the axes CC and DD.

The mode of operation is similar to the one described hereinabove:

1. The photograph is inserted under the plate 13 and the axes of this photograph are caused to register with the traced axes AA and BB.
2. The transparent rule 18 is moved, and C'C' and D'D' are caused to register with the pupil.
3. The optical center O of the lens is brought upon the axes CC and DD and the suction cup 1 is applied.

Some difficulties may be experienced in forming a rule 18 displaceable relative to itself. The same result may be obtained by dividing this rule into two superposed half-rules, the first one carrying the two vertical lines C'C' and CC, and being movable to the right, the other rule carrying the horizontal lines D'D' and DD and being displaceable vertically. Instead of moving a single rule 18, the two half-rules are acted upon in succession, the positions being determined by the intersection of the crosslines as in the preceding cases.

Figure 9:
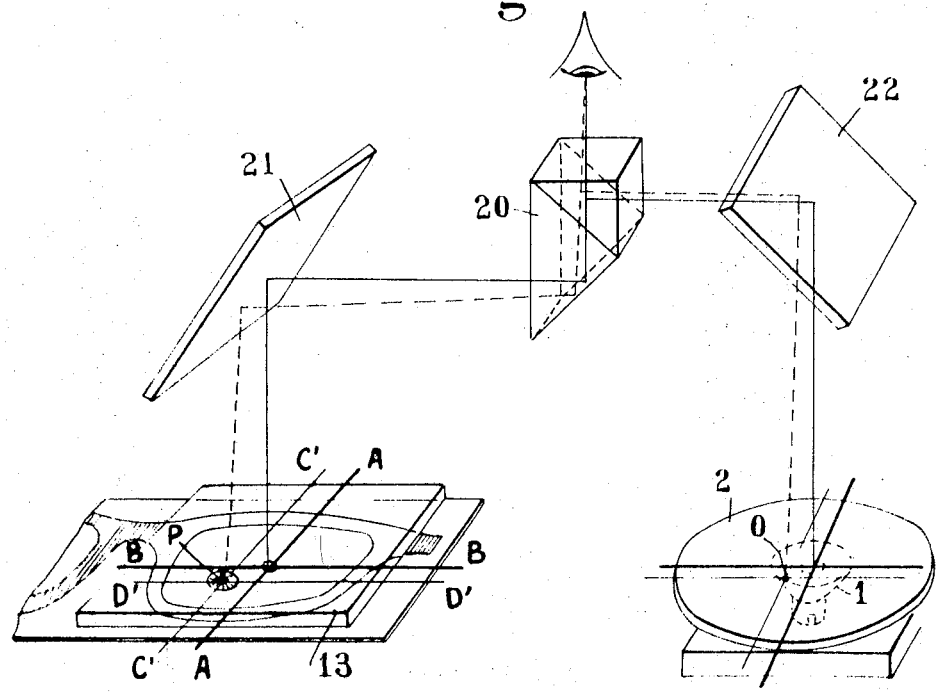

In the arrangement illustrated in FIG. 9, a camera lucida is used wherein an eyepiece in the form of a dividing prism 20 is associated with a pair of lateral mirrors 21 and 22 inclined at 45° whereby the images of the photograph of FIG. 4 inserted under the engraved plate 13 and the image of the untrimmed lens 2 can be superposed on the observer's retina, as shown.

The observer will readily ascertain the degree of out of center of the centerlines AA and BB of the spectacle frame and of the axes C'C' and D'D' passing through the pupil axis P. Thus, the lens 2 is shifted a in the example illustrated in FIGS. 6 and 7 to cause the optical center O of the lens to register with the pupillary axis P.

The thus positioned lens may be retained by a presser member and the suction cup may be pressed against the concave face of the lens. THe reverse procedure may also be adhered to, if necessary.

A suitable lighting device is provided for more or less illuminating either the photograph or the suction cup.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim and desire to secure by LETTERS PATENT is:

1. An apparatus cooperative with a photograph depicting indexing indicia representative of a pupillary center and a lens frame reference point for positioning an untrimmed lens relative to a lens holder comprising: means defining a first support for supporting thereon in an adjustable position a photograph depicting indexing indicia representative of a pupillary center and a lens frame reference point; a transparent indexing plate having indexing indicia thereon representative of a lens template reference point positionable over said photograph when same is on said first support to effect alignment of said indexing indicia representative of said lens template reference point with said indexing indicia representative of said lens frame reference point; means defining a second support for movably supporting an untrimmed lens; a lens holder operable to releasably hold an untrimmed lens during a trimming operation cooperative with said second support to provide another indexing indicia representative of said lens template reference point; and optical means for simultaneously viewing in superposed relationship said first and second supports to sequentially effect optical alignment of both said indexing indicia representative of said lens template reference point, optical alignment of said indexing indicia representative of said lens frame reference point with said indexing indicia on said transparent indexing plate representative of said lens template reference point, and optical alignment of the optical center of said untrimmed lens with said indexing indicia representative of said pupillary center; whereby said untrimmed lens is correctly positioned with respect to said lens holder to undergo a trimming operation.

2. An apparatus according to claim 1; wherein said lens holder includes a suction cup configured to releasably hold said untrimmed lens during a trimming operation.

3. An apparatus according to claim 2; further comprising means for effecting releasable engagement of said suction cup with said untrimmed lens.

4. An apparatus according to claim 2, wherein said second support includes therein means defining an opening shaped to releasably receive therein a portion of said suction cup thereby defining said another indexing indicia.

5. An apparatus according to claim 1; wherein said optical means comprises means for reflecting the images contained on said first and second supports along separate optical axes, and means positioned along said separate optical axes receptive of said reflected images for superposing same into a single image.

6. An apparatus according to claim 5; wherein said last-mentioned means comprises a mixing prism.

7. Method of positioning an untrimmed lens relative to a lens holder comprising: providing a transparent reference plate having an indexing indicia thereon representative of a lens template reference point; providing a lens holder capable of releasably holding an untrimmed lens during a trimming operation having markings thereon representative of said lens template reference point; simultaneously viewing in superposed relationship both said indexing indicia and said markings to effect positioning of said transparent reference plate in an aligned working position relative to said lens holder; providing a reference surface having indexing indicia thereon representative of both a pupillary center and a lens frame reference point; positioning said reference surface relative to said transparent reference plate to effect alignment of said indexing indicia representative of said frame reference point with said indexing indicia representative of said lens template reference point; providing an untrimmed lens in superposed relationship with said lens holder for movement relative thereto; and simultaneously viewing in superposed relationship said indexing indicia representative of said pupillary center and the optical center of said untrimmed lens to effect positioning of said untrimmed lens relative to lens holder in accordance with said indexing indicia contained on said reference surface.

8. Method of positioning an untrimmed lens with respect to a lens holder comprising: providing a reference surface having indexing indicia thereon representative of both a pupillary center and a lens frame reference point; providing a transparent reference plate having an indexing indicia thereon representative of a lens template reference point: positioning said reference surface relative to said transparent reference plate to effect alignment of said indexing indicia representative of said lens frame reference point with said indexing indicia representative of said lens template reference point; positioning an untrimmed lens relative to the aligned transparent reference plate and reference surface to effect alignment of the optical center of said untrimmed lens with said indexing indicia representative of said pupillary center; providing a lens holder capable of releasably holding an untrimmed lens during a trimming operation having markings thereon representative of said lens template reference point; and positioning said lens holder relative to the aligned transparent reference plate, reference surface and untrimmed lens to effect alignment of said markings with said indexing indicia on said transparent reference plate representative of said lens template reference point in accordance with said indexing indicia contained on said reference surface.

9. A device in combination with a photograph having orthogonal axes representative of a spectacle mounting and a pupillary center for centering, orienting, and securing to a suction cup an optical lens for trimming by a grinding machine to fit in a given spectacle mounting intended for a predetermined user comprising: a casing constituting a camera lucida provided with a first support on which said photograph is laid, centered and oriented; a transparent plate having thereon two orthogonal lines and dimensioned to be laid upon said photograph so that its two lines are coincident with said orthogonal axes representative of the spectacle mounting which are shown by said photograph; a second support on which said optical lens having conventional reference marks thereon is dimensioned to be laid, centered and oriented; a suction-cup carrier movable into a predetermined and constant operative position in relation to said second support; a suction cup secured to said suction-cup carrier; means for securing said suction cup to said optical lens after the latter has been brought to a desired position on said second support; and optical means operative to permit simultaneous observance, in superposed relationship, said first and second supports to effect superposition of one point or line of one support with a point or line of the other support; thereby giving the possibility of firstly moving said transparent plate on said first support with a view to superpose the point of intersection of its two reference lines to the axis of said suction cup, the inserting said photograph under said plate in the above-defined relative position, subsequently moving said optical lens on said second support so that its optical center be superposed to said pupillary center reproduced on said photograph, and finally securing said suction cup to said optical lens.

10. A device as set forth in claim 9; in which said optical means comprises a mixing prism cooperative with a pair of mirrors to superpose into a single beam the two beams orthogonal to the observation plane corresponding to said first and second supports.

11. A device as set forth in claim 9; wherein said suction cup carrier and the suction cup are mounted beneath said second support by sliding at right angles thereto; said second support having a window engageable by said suction cup.

12. A device as set forth in claim 11; wherein a counter suction cup may be brought in coaxial relationship to said suction cup and suction cup carrier for coacting therewith by rotating about an axis parallel to said axis.

13. Device as set forth in claim 9, characterized in that said suction cup carrier is movable about an axis parallel to its own axis in order to improve the visibility during the positioning operation, the exact coincidence between the suction cup and the intersection of said reference lines being provided by a lateral stop member engageable by a movable arm.

14. Device as set forth in claim 9, characterized in that said transparent plate is divided into a fixed plate and a movable plate in its plane, by translation, each plate comprising secondary reference lines parallel to the main reference lines, the intersection of said secondary reference lines being shifted in the plane by a same distance in relation to the intersection of said main reference lines.